United States Patent
Wada

(10) Patent No.: US 8,240,279 B2
(45) Date of Patent: Aug. 14, 2012

(54) ENGINE VALVE CONTROL DEVICE

(75) Inventor: Minoru Wada, Obu (JP)

(73) Assignee: Denso Corporation, Kariya (JP)

( * ) Notice: Subject to any disclaimer, the term of this patent is extended or adjusted under 35 U.S.C. 154(b) by 259 days.

(21) Appl. No.: 12/836,719

(22) Filed: Jul. 15, 2010

(65) Prior Publication Data

US 2011/0011360 A1   Jan. 20, 2011

(30) Foreign Application Priority Data

Jul. 20, 2009   (JP) .................................. 2009-169634

(51) Int. Cl.
*F01L 1/34* (2006.01)
(52) U.S. Cl. .................... 123/90.15; 123/90.12; 464/160
(58) Field of Classification Search ............... 123/90.15, 123/90.17, 90.12; 464/160
See application file for complete search history.

(56) References Cited

U.S. PATENT DOCUMENTS 6,196,174 B1   3/2001   Wada et al.
7,513,233 B2 *   4/2009   Ichimura et al. ........... 123/90.17

FOREIGN PATENT DOCUMENTS

JP   2003-254098   9/2003
JP   2007-309265   11/2007

* cited by examiner

*Primary Examiner* — Ching Chang
(74) *Attorney, Agent, or Firm* — Nixon & Vanderhye PC

(57) ABSTRACT

An engine valve control device is applied to an engine valve control mechanism having a VVT (valve timing adjusting device), an OCV (control valve) that controls a flow of hydraulic oil supplied to the VVT, and an electromagnetic solenoid that controls an operation of the OCV according to a control duty (control command value). The engine valve control device calculates the control duty based on a holding duty, which occurs when an actual phase does not change but is held, and feedback correction values. The engine valve control device corrects the value of the holding duty in accordance with a steady-state deviation between the actual phase and a target phase to perform learning for storing and updating the holding duty value. If temperature of the hydraulic oil is low, the learning is prohibited even when the steady-state deviation is occurring.

6 Claims, 9 Drawing Sheets

ENGINE VALVE CONTROL DEVICE

CROSS REFERENCE TO RELATED APPLICATION

This application is based on and incorporates herein by reference Japanese Patent Application No. 2009-169634 filed on Jul. 20, 2009.

BACKGROUND OF THE INVENTION

1. Field of the Invention

The present invention relates to an engine valve control device applied to an engine valve control mechanism that adjusts opening-closing timings of an exhaust valve or an intake valve (engine valve) of an internal combustion engine.

2. Description of Related Art

Generally, an engine valve control mechanism that adjusts opening-closing timings of an engine valve includes a hydraulic actuator that varies a rotation phase of a camshaft with respect to a crankshaft, a control valve that controls a flow of hydraulic oil supplied to the hydraulic actuator, and an electromagnetic solenoid that controls an operation of the control valve according to a control command value.

For example, according to a calculation method of the control command value described in Patent document 1 (JP-A-2007-309265), a current value applied to the electromagnetic solenoid when a deviation between an actual rotation phase (actual phase) and a target phase does not change largely but is stable is stored as a holding value, first. Then, a feedback correction value calculated from the deviation is added to the holding value to calculate the control command value. When the deviation occurs steadily, the holding value is corrected in accordance with the steady-state deviation occurring steadily, thereby storing and updating (i.e., learning) the holding value.

When temperature of the hydraulic oil is low, the viscosity of the hydraulic oil increases, so response speed of the hydraulic actuator with respect to change in the control command value lowers. That is, response speed of the actual phase with respect to change of the target phase becomes slow.

Therefore, when the actual phase is changing gradually toward the target phase because of such the low temperature, there is a possibility that it is determined that the steady-state deviation is occurring. In such the case, the holding value is corrected according to the steady-state deviation and the holding value is stored and updated (i.e., learned). Moreover, the steady-state deviation cannot be canceled by correcting the holding value only once when the temperature is low. Therefore, the holding value is corrected multiple times, thereby causing excessive correction.

If the control command value is calculated based on the holding value corrected excessively in this way and the control valve is controlled, there occurs a concern that the actual phase hunts largely with respect to the target phase.

SUMMARY OF THE INVENTION

It is an object of the present invention to provide an engine valve control device that inhibits hunting of an actual rotation phase with respect to a target phase.

According to a first example aspect of the present invention, an engine valve control device is applied to an engine valve control mechanism having a hydraulic actuator that varies a rotation phase of a camshaft with respect to a crankshaft, a control valve that controls a flow of hydraulic oil supplied to the hydraulic actuator, and an electromagnetic solenoid that controls an operation of the control valve according to a control command value. The engine valve control device has a control command value calculation section for calculating the control command value based on a holding value, which is a current value applied to the electromagnetic solenoid when the rotation phase does not change but is held, and a feedback correction value. The engine valve control device has a feedback correction section for calculating the feedback correction value in accordance with a deviation between an actual rotation phase (actual phase) and a target phase. The engine valve control device has a learning section for determining the deviation to be a steady-state deviation when the deviation occurs continuously for a predetermined time and for correcting the holding value in accordance with the steady-state deviation, thereby performing learning for storing and updating the holding value. If temperature of the hydraulic oil is lower than a predetermined threshold value, the learning by the learning section is prohibited even when the steady-state deviation is occurring.

With such the construction, the learning of the holding value is prohibited when the temperature is low. Accordingly, when the actual phase is changing gradually toward the target phase because of the low temperature, the repetitive correction and learning of the holding value, which can occur when it is determined that the steady-state deviation is occurring, can be avoided. Thus, the hunting of the actual phase with respect to the target phase can be inhibited.

According to a second example aspect of the present invention, the engine valve control device further has a steady-state deviation correction section for calculating a steady-state deviation correction value in accordance with the steady-state deviation if the steady-state deviation occurs when the hydraulic oil temperature is lower than the predetermined threshold value. The control command value calculation section calculates the control command value based on the steady-state deviation correction value.

The hunting can be suppressed by prohibiting the learning of the holding value when the temperature is low. However, there is still a concern that it takes a long time for the actual phase to approximate to the target phase. Regarding this concern, according to the above aspect of the resent invention, the control command value is calculated based on the steady-state deviation correction value corresponding to the steady-state deviation. Therefore, the time necessary for the actual phase to approximate to the target phase can be shortened. Moreover, since the learning of the holding value is prohibited, the effect of inhibiting the hunting mentioned above is not hindered by the steady-state deviation correction value.

According to a third example aspect of the present invention, the control command value calculation section calculates the control command value in a feedback mode that uses the feedback correction value when the deviation is larger than a predetermined value. The control command value calculation section calculates the control command value in a holding mode that does not use the feedback correction value when the deviation is equal to or smaller than the predetermined value. The control command value calculation section resets the steady-state deviation correction value to zero when a mode switches from the feedback mode to the holding mode.

If the steady-state deviation correction (i.e., calculation of control command value based on steady-state deviation correction value), which is performed when the actual phase is changing gradually toward the target phase because of the low temperature, is continued for a long time as it is, the actual phase will overshoot. Therefore, it is necessary to interrupt the continuation of the steady-state deviation correction and to reset the steady-state deviation correction value to zero. The above-described effect of shortening the time by the steady-state deviation correction is exerted in the feedback mode. However, the execution of such the steady-state deviation correction is unnecessary in the holding mode, in which the deviation is equal to or smaller than the predetermined value.

According to the above-described aspect of the present invention taking these points into account, the steady-state deviation correction value is reset to zero when the mode switches from the feedback mode to the holding mode, i.e., when the steady-state deviation correction becomes unnecessary. Thus, the continuation of the steady-state deviation correction is interrupted without hindering the above-described effect of shortening the time, thereby eliminating the problem of the overshoot.

According to a fourth example aspect of the present invention, the control command value calculation section resets the steady-state deviation correction value to zero when the deviation changes to an extent that the deviation goes out of a predetermined stable range.

If the steady-state deviation correction (i.e., calculation of control command value based on steady-state deviation correction value), which is performed when the actual phase is changing gradually toward the target phase because of the low temperature, is continued for a long time as it is, the actual phase will overshoot. Therefore, it is necessary to interrupt the continuation of the steady-state deviation correction and to reset the steady-state deviation correction value to zero. For example, when the deviation changes largely to an extent that the deviation goes out of a predetermined stable range due to a rapid change of the target phase, the control command value changes largely due to the feedback correction value. Therefore, the above-described effect of shortening the time by the steady-state deviation correction is not required under such the situation.

According to above-described aspect of the present invention taking this point into account, the steady-state deviation correction value is reset to zero when the deviation changes to an extent that the deviation goes out of the predetermined stable range. Therefore, the continuation of the steady-state deviation correction is interrupted without hindering the above-described effect of shortening the time, thereby eliminating the problem of the overshoot.

According to a fifth example aspect of the present invention, the engine valve control device further has an oil pressure correction section for calculating an oil pressure correction value for the control command value in accordance with pressure of the hydraulic oil. The control command value calculation section calculates the control command value based on the oil pressure correction value.

Even when the control command value is the same and the actuated position of the control valve is the same, the operation speed of the hydraulic actuator varies if the pressure of the hydraulic oil at the time varies. According to the above-described aspect of the present invention taking this point into account, the control command value is calculated based on the hydraulic oil pressure. Therefore, when the actual phase is controlled to the target phase, controllability (e.g., quick reaction property, stability and accuracy of control) can be improved.

According to a sixth example aspect of the present invention, the hydraulic actuator has a first rotating body that rotates with either one of the crankshaft and the camshaft, a second rotating body that rotates with the other one of the crankshaft and the camshaft, and a spring member that applies an elastic force to the rotating bodies such that the rotation phase approximates to a predetermined phase. The engine valve control device further has a phase correction section for calculating a phase correction value for the control command value in accordance with the actual rotation phase (actual phase). The control command value calculation section calculates the control command value based on the phase correction value.

In the engine valve control mechanism having the above-described construction, the elastic deformation amount changes according to the actual phase. Therefore, even if the deviation between the actual phase and the target phase is the same, the operation speed of the hydraulic actuator differs according to the actual phase at the time. According to the above-described aspect of the present invention taking this point into account, the control command value is calculated based on the actual phase. Therefore, when the actual phase is controlled to the target phase, the controllability (e.g., quick reaction property, stability and accuracy of control) can be improved.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
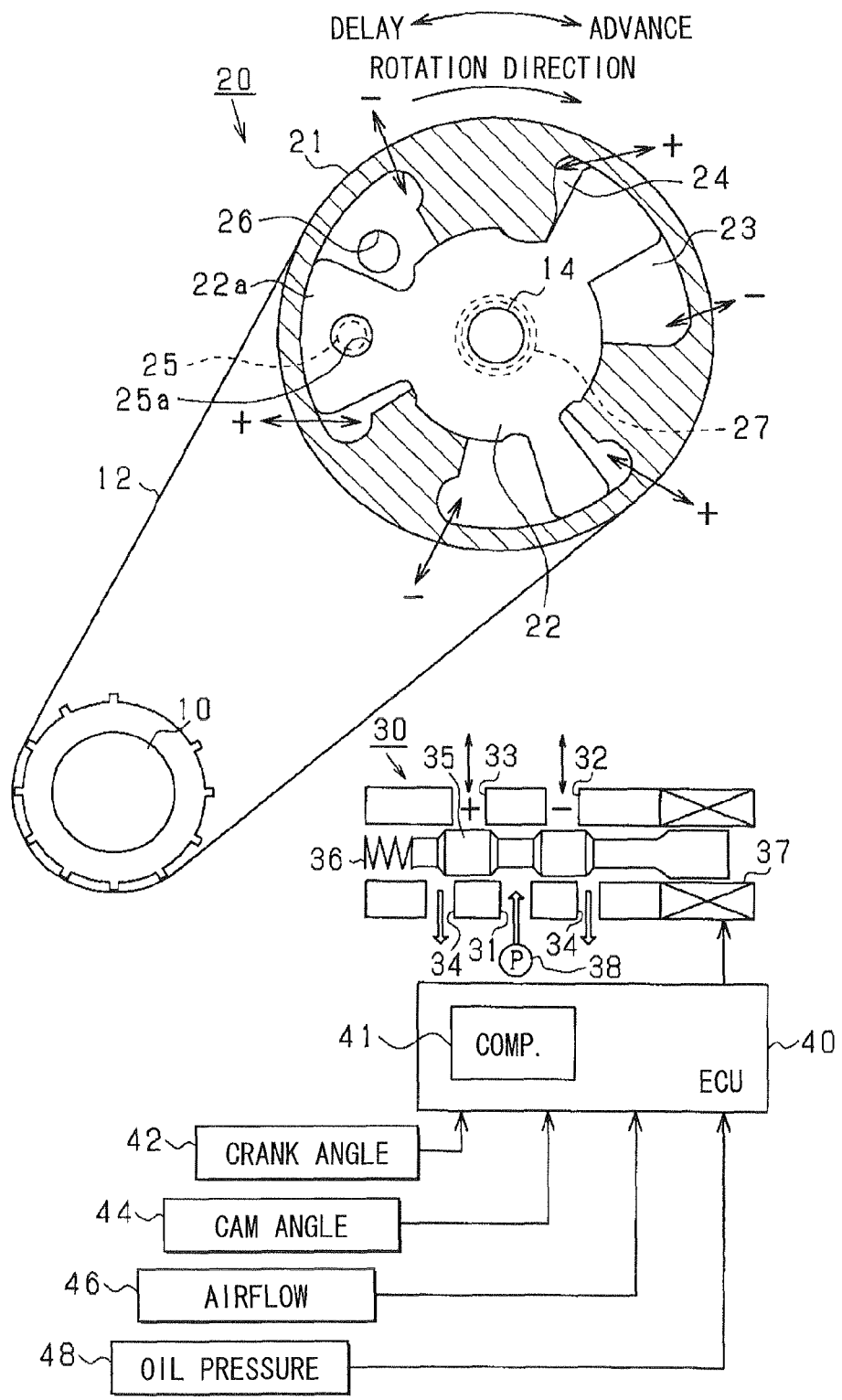
FIG. 1 is a diagram showing an entire construction of an engine valve control mechanism according to a first embodiment of the present invention.

Hereafter, embodiments of the present invention will be described with reference to the drawings. In the following description of the respective embodiments, the same sign is used in the drawings for identical or equivalent parts.

First Embodiment

FIG. 1 shows an entire construction of an engine valve control mechanism according to a first embodiment of the present invention.

In FIG. 1, a power of a crankshaft 10 (output shaft) of an engine (internal combustion engine) is transmitted to a camshaft 14 via a belt 12 and a valve timing adjusting device 20 (referred to as VVT, hereafter). The VVT 20 has a first rotating body 21 (housing) mechanically linked with the crankshaft 10 and a second rotating body 22 (vane rotor) mechanically linked with the camshaft 14. In the present embodiment, the second rotating body 22 has multiple protrusions 22a (vanes) and is accommodated in the first rotating body 21. The protrusions 22a of the second rotating body 22 and an inner wall of the first rotating body 21 define delay chambers 23 and advance chambers 24. The delay chambers 23 delay a rotation angle (i.e., relative rotation phase) of the camshaft 14 relative to the crankshaft 10. The advance chambers 24 advance the relative rotation phase.

The VVT 20 has a lock mechanism that locks the both rotating bodies 21, 22 to disable relative rotation therebetween at the phase that minimizes an amount of overlap, in which both the intake valve and the exhaust valve (engine valves) open. That is, the most advanced phase, at which the volume of the advance chamber 24 is maximized, should be preferably used as the lock position of the VVT 20 of the exhaust valve. The most delayed phase, at which the volume of the delay chamber 23 is maximized, should be preferably used as the lock position of the VVT 20 of the intake valve.

The lock mechanism is constituted by a lock pin 25 provided to the second rotating body 22, a lock hole 26 provided in the first rotating body 21 and the like. The lock pin 25 is fixed such that the lock pin 25 can move forward and backward between an accommodation position, at which the lock pin 25 is accommodated in an accommodation hole 25a formed in the second rotating body 22, and a protrusion position, at which the lock pin 25 protrudes from the accommodation hole 25a toward the lock hole 26. A spring (not shown) for applying an elastic force to the lock pin 25 toward the protrusion side is provided in the accommodation hole 25a. The VVT 20 is structured such that a part of the hydraulic oil discharged from a hydraulic pump 38 is supplied to the accommodation hole and biases the lock pin 25 in a direction opposite to the protrusion side (i.e., toward accommodation side).

Therefore, if a predetermined time elapses after the hydraulic pump 38 starts driving with an engine start and the hydraulic pump 38 increases the hydraulic oil pressure sufficiently, the lock pin 25 in the protrusion position moves toward the accommodation position against the elastic force of the spring. If the lock pin 25 in the protrusion position fits to the lock hole 26, the rotating bodies 21, 22 are locked to disable the relative rotation therebetween.

When the engine is stopped, the target phase is set such that the lock pin 25 fits into the lock hole 26. Thus, control (lock control) for conforming the relative rotation phase to the lock position is performed. Thus, the VVT 20 is in the locked state when the engine is started next time. Therefore, even during a period immediately after the start in which the hydraulic oil pressure in the delay chamber 23 and the advance chamber 24 has not increased sufficiently, the relative rotation phase can be held at the lock position without causing a large fluctuation of the relative rotation phase.

A coil spring 27 (spring member) is engaged to the both rotating bodies 21, 22 for applying an elastic force to the both rotating bodies 21, 22, thereby approximating the actual phase to the lock position. The coil spring 27 assists the VVT 20 to operate to the lock position with the elastic force in the lock control.

The VVT 20 is a hydraulic actuator, which is hydraulically driven by an inflow and an outflow of the hydraulic oil to and from the delay chamber 23 and the advance chamber 24. The inflow and the outflow of the hydraulic oil are controlled by an oil control valve 30 (OCV).

The OCV 30 supplies the hydraulic oil from the hydraulic pump 38 to the delay chamber 23 or the advance chamber 24 through a supply passage 31 and a delay passage 32 or an advance passage 33. The OCV 30 causes the hydraulic oil to flow out of the delay chamber 23 or the advance chamber 24 to an oil pan (not shown) through the delay passage 32 or the advance passage 33 and a discharge passage 34. In FIG. 1, "−" indicates the communication between the delay chambers 23 and the delay passage 32, and "+" indicates the communication between the advance chambers 24 and the advance passage 33.

A spool 35 is pushed by a spring 36 to the right side in FIG. 1. An electromagnetic solenoid 37 applies a power in the leftward direction of FIG. 1 to the spool 35. Therefore, a position of the spool 35 can be operated by adjusting a duty (i.e., duty ratio) of a control current (control command value) applied to the electromagnetic solenoid 37. Eventually, a flow passage area between the delay passage 32 or the advance passage 33 and the supply passage 31 or the discharge passage 34 is adjusted by the spool 35.

For example, if the spool 35 is displaced to the right side from the position shown in FIG. 1, the hydraulic oil is supplied from the hydraulic pump 38 to the delay chamber 23 through the supply passage 31 and the delay passage 32. In addition, the hydraulic oil is discharged from the advance chamber 24 to the oil pan through the advance passage 33 and the discharge passage 34. Thus, the second rotating body 22 rotates relative to the first rotating body 21 in a counterclockwise direction, so the relative rotation phase changes to the delay side.

If the spool 35 is displaced to the left side from the position shown in FIG. 1, the hydraulic oil is supplied from the hydraulic pump 38 to the advance chamber 24 through the supply passage 31 and the advance passage 33. In addition, the hydraulic oil is discharged from the delay chamber 23 to the oil pan through the delay passage 32 and the discharge passage 34. Thus, the second rotating body 22 rotates relative to the first rotating body 21 in a clockwise direction, so the relative rotation phase changes to the advance side.

When the spool 35 is located at the position shown in FIG. 1 to block the delay passage 32 and the advance passage 33, the outflow and the inflow of the hydraulic oil from and to the delay chamber 23 and the advance chamber 24 are stopped, so the relative rotation phase is held. The duty value of the control current at the time when the phase is held in this way will be referred to as a holding duty value (holding value), hereafter.

An electronic control unit 40 (ECU) that adjusts the duty of the control current applied to the electromagnetic solenoid 37 is constituted mainly by a microcomputer 41. The ECU 40 takes in sensing values of various operation states of the internal combustion engine such as sensing values of a crank angle sensor 42 that senses a rotation angle of the crankshaft 10, a cam angle sensor 44 that senses a rotation angle of the camshaft 14, an airflow meter 46 that senses an intake air quantity and an oil pressure sensor 48 that senses pressure of the hydraulic oil supplied to the VVT 20. The ECU 40 performs various calculations based on the sensing values and controls operations of various actuators of the internal combustion engine such as the OCV 30 based on the calculation results.

For example, the ECU 40 calculates engine rotation speed NE based on the sensing value of the crank angle sensor 42. The ECU 40 calculates the intake quantity (engine load) based on the sensing value of the airflow meter 46. The ECU 40 calculates the actual relative rotation phase (actual phase) based on the sensing values of the crank angle sensor 42 and the cam angle sensor 44. The ECU 40 calculates the target phase based on the engine rotation speed NE, the engine load and the like, which are calculated. For example, when the engine load is heavy and the engine rotation speed NE is high, the target phase is calculated to increase the amount of the overlap, in which both of the intake valve and the exhaust valve open, thereby increasing an output of the internal combustion engine. When the engine load is light and the engine rotation speed NE is low (e.g., during idling), the target phase is calculated to decrease the overlap amount, thereby stabilizing the combustion in the internal combustion engine. Further, the ECU 40 performs feedback control to approximate a deviation between the actual phase and the target phase to zero.

The ECU 40 adjusts the duty of the control current applied to the electromagnetic solenoid 37 based on the target phase. Thus, the relative rotation phase of the VVT 20 is adjusted. Eventually, the relative rotation phase of the camshaft 14 with respect to the crankshaft 10 is adjusted. As a result, opening-closing timings of the exhaust valve or the intake valve of the internal combustion engine are adjusted, and the overlap amount is adjusted. In the present embodiment, the VVT 20 having the above-described construction is mounted to the camshaft 14 that drives the intake valve. The VVT 20 is not mounted to the camshaft that drives the exhaust valve. The present invention can be applied to a construction, in which the VVT 20 is mounted to at least one of the both camshafts.

Figure 2:
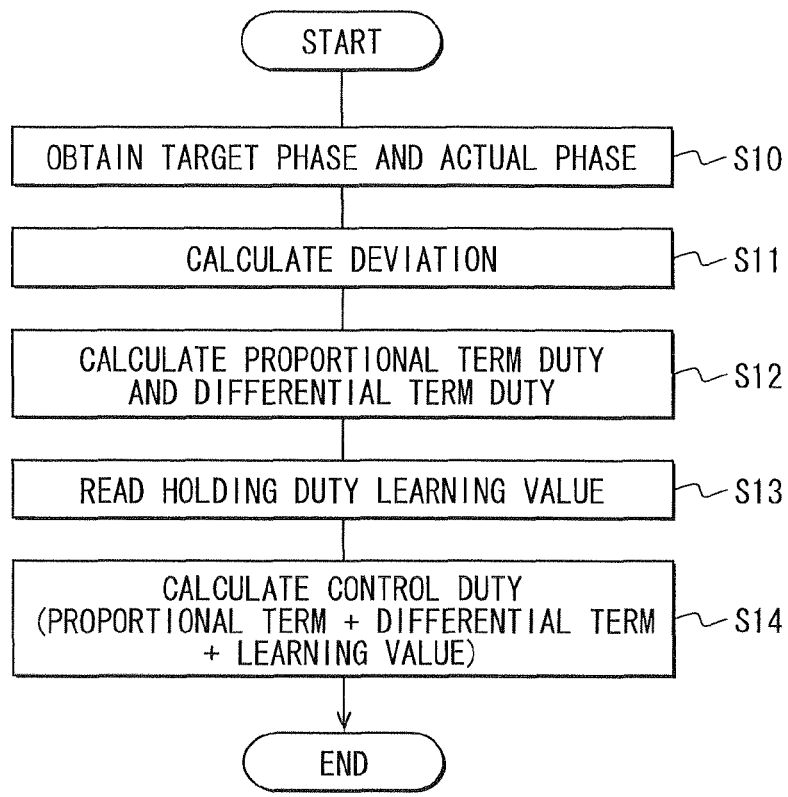
FIG. 2 is a flowchart showing a procedure for calculating a control duty value of a control current according to the first embodiment.

FIG. 2 is a flowchart showing a calculation procedure of the control duty used when the microcomputer 41 of the ECU 40 controls the duty (control duty) of the control current applied to the electromagnetic solenoid 37. The processing is triggered by a switching-on operation of an ignition switch and is repeatedly performed in a predetermined cycle thereafter.

First in S10 of FIG. 2 (S means "Step"), the actual phase of the VVT 20 is obtained. The actual phase of the VVT 20 is calculated from both of the sensing values of the crank angle sensor 42 and the cam angle sensor 44. In addition, the target phase calculated based on the engine rotation speed NE and the engine load as mentioned above is obtained. In following S11, a deviation between the target phase and the actual phase obtained in S10 is calculated.

In following S12 (feedback correction section), a proportional term duty and a differential term duty of the feedback control are calculated based on the deviation calculated in S11. More specifically, the proportional term duty (as feedback correction value) is calculated in proportion to the deviation. The differential term duty (as feedback correction value) is calculated in proportion to speed of change of the deviation.

Figure 3:
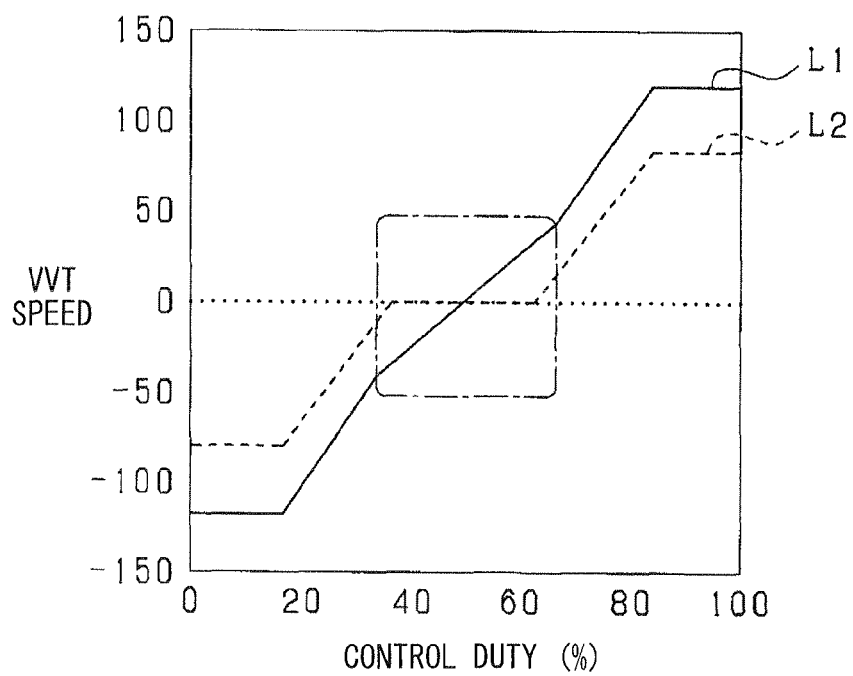
FIG. 3 is a characteristic diagram showing a relationship between operation speed of a VVT and the control duty according to the first embodiment.

FIG. 3 is a characteristic diagram showing a relationship between operation speed of the VVT 20 and the control duty. In FIG. 3, a solid line L1 indicates a characteristic at the time when temperature of the hydraulic oil is high. A broken line L2 indicates a characteristic at the time when the temperature of the hydraulic oil is low. The value of the control duty at the time when the operation speed of the VVT 20 is zero, i.e., at the time when the actual phase of the VVT 20 does not change but is held, will be referred to as a holding duty, hereafter.

The viscosity of the hydraulic oil increases as the temperature of the hydraulic oil decreases. Therefore, the change of the operation speed of the VVT 20 with respect to the change of the control duty decreases as the temperature of the hydraulic oil decreases. That is, the response of the VVT 20 at the time when the control duty is changed worsens as the temperature of the hydraulic oil decreases. Specifically, the response at the low temperature deteriorates significantly in an area near the holding duty (area shown by chained line in FIG. 3). Therefore, it is necessary to learn the holding duty value by successively storing and updating the holding duty value. Such the learning of the holding duty value is performed in processing of FIG. 4 explained later. In S13 of FIG. 2, the learning value of the learned holding duty is read.

In following S14 (control command value calculation section), the control duty of the current passed to the electromagnetic solenoid 37 is calculated based on the learning value of the holding duty, the proportional term duty and the differential term duty obtained in S12 and S13. More specifically, the control duty is calculated by adding the proportional term duty and the differential term duty to the holding duty learning value.

When the deviation is larger than a predetermined value, the feedback control is performed in a feedback mode for calculating the control duty using the proportional term duty and the differential term duty. However, the feedback control is unnecessary when the deviation is smaller than the predetermined value. Therefore, in such the case, the calculation of the proportional term duty and the differential term duty in S12 is stopped, and these feedback correction values are set at zero. That is, the mode is switched to a holding mode for calculating the control duty based on the holding duty without using the feedback correction values.

Next, the learning procedure of the holding duty value performed by the microcomputer 41 will be explained with reference to FIG. 4. The processing is triggered by the switching-on operation of the ignition switch and is repeatedly performed in a predetermined cycle thereafter.

Figure 4:
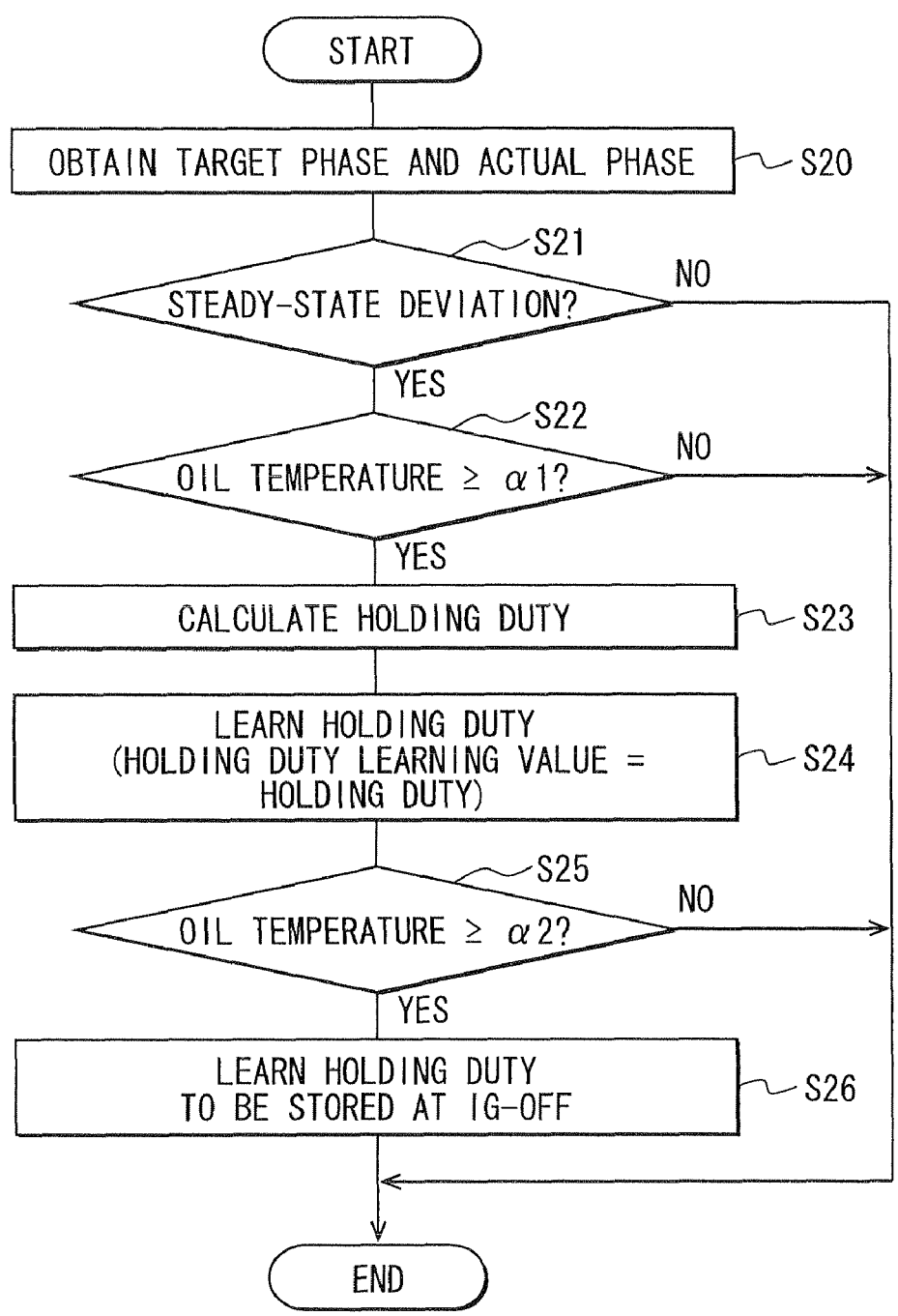
FIG. 4 is a flowchart showing a procedure for learning a holding duty value according to the first embodiment.

First in S20 of FIG. 4, the actual phase and the target phase of the VVT 20 are obtained like S10. In following S21, it is determined whether the deviation between the target phase and the actual phase obtained in S20 is occurring steadily. More specifically, it is determined that the steady-state deviation is occurring when a state, in which both of change amounts of the target phase and the actual phase are stable within a predetermined range, continues for a predetermined time or longer while the deviation occurs.

When it is determined that the steady-state deviation is occurring (S21: YES), it is determined in following S22 whether the hydraulic oil temperature is equal to or higher than a first determination value α1 (for example, 60 degrees C.). When it is determined that the hydraulic oil temperature is equal to or higher than the first determination value α1 (S22: YES), the control duty at the time (i.e., holding duty) is calculated in following S23. In following S24 (learning section), the holding duty calculated in S23 is stored and updated as the learning value, which is stored in a rewritable volatile memory such as RAM.

When the steady-state deviation is occurring, there is a high possibility that the holding duty has deviated from the true value. Therefore, the update (learning) is performed by using the control duty at the time as the holding duty in S21 to S24. When the hydraulic oil temperature is high and the condition of S22 is satisfied (oil temperature≧first determination value α1), the holding duty is updated. The update of the holding duty is prohibited when the oil temperature is low.

In following S25, it is determined whether the hydraulic oil temperature is equal to or higher than a second determination value α2 (for example, 80 degrees C.). The second determination value α2 is set higher than the first determination value α1. If the oil temperature is determined to be equal to or higher than the second determination value α2 (S25: YES), the holding duty at the time is stored in a rewritable nonvolatile memory such as EEPROM in following S26 as an initial value for next engine start. Thus, the holding duty to be stored at ignition-off (IG-OFF) is learned.

As the hydraulic oil temperature increases, accuracy and reliability of the value of the holding duty with respect to the true value improve. Therefore, the condition for the learning in S26 (i.e., second determination value α2) is set severer (i.e., at higher temperature) than the condition for the learning in S24 (i.e., first determination value α1).

Figure 5:
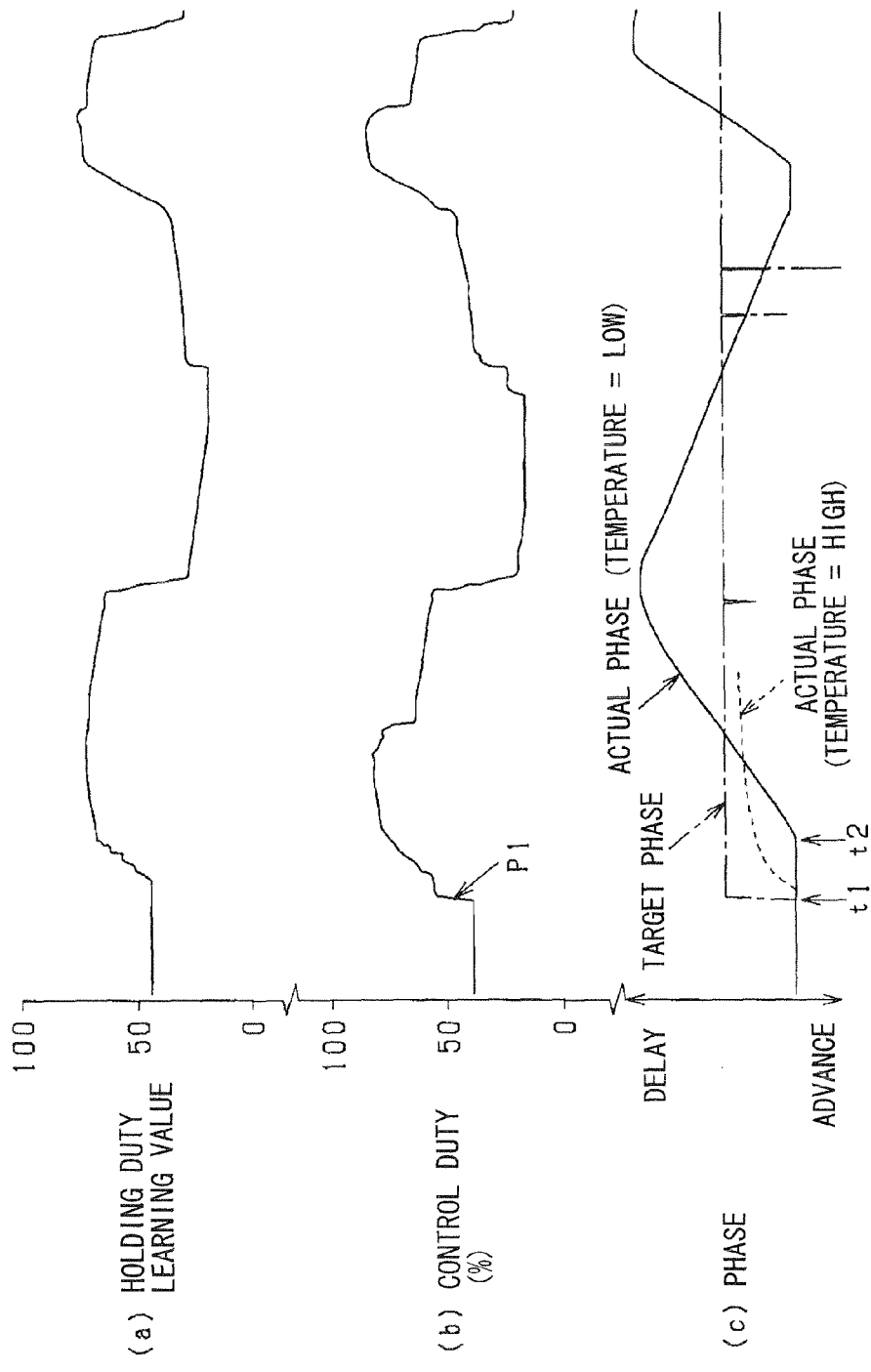
FIG. 5 is a time chart showing hunting of a phase caused when a holding duty is updated at low temperature in a comparative example.

The update of the holding duty is prohibited when the oil temperature is low as mentioned above. If the update of the holding duty is permitted also when the oil temperature is low, a problem such as hunting of the actual phase will occur as shown in part (c) of FIG. 5. This problem will be explained with reference to FIG. 5 below. In FIG. 5, part (a) shows change of the holding duty learning value, and part (b) shows change of the control duty. In part (c), a chained line shows change of the target phase, a solid line shows change of the actual phase at the time when the hydraulic oil temperature is low, and a broken line shows change of the actual phase at the time when the hydraulic oil temperature is high.

First, if the target phase changes largely from a stable state, in which the target phase coincides with the actual phase, at a time point t1 (refer to part (c) of FIG. 5), the feedback correction values corresponding to the change are added to the holding duty, whereby the control duty changes (refer to P1 in part (b) of FIG. 5).

If the temperature of the hydraulic oil is high, the actual phase changes to follow the target phase immediately after the time point t1 as shown by the broken line in part (c) of FIG. 5. When the hydraulic oil temperature is low, the response of the VVT 20 with respect to the change of the control duty is slow, so a time lag from the time point t1, at which the target phase changes, to a time point t2, at which the actual phase starts changing, lengthens (refer to solid line in part (c) of FIG. 5). Therefore, it is determined that the steady-state deviation is occurring during the period from t1 to t2, so the holding duty learning value is corrected successively and repeatedly until the time point t2 (refer to part (a) of FIG. 5). As a result, the holding duty learning value is corrected excessively and the actual phase hunts.

As a countermeasure against the problem, according to the present embodiment explained above, the holding duty is learned on the condition that the hydraulic oil temperature is equal to or higher than the first determination value. The learning of the holding duty is prohibited when the hydraulic oil temperature is lower than the first determination value. Therefore, the above-mentioned excessive correction of the holding duty learning value can be avoided, and the hunting of the actual phase can be inhibited.

Second Embodiment

Next, a second embodiment of the present invention will be described.

In the above-described first embodiment, the control duty is calculated based on the holding duty learning value and the feedback correction values (proportional term duty and differential term duty). In the second embodiment, the control duty is calculated by taking into account a steady-state deviation correction value A1 explained below in addition to the holding duty learning value and the feedback correction values. Hereafter, processing contents according to the present embodiment shown in FIGS. 6 and 7 will be explained, focusing on differences from FIGS. 2 and 4.

Figure 6:
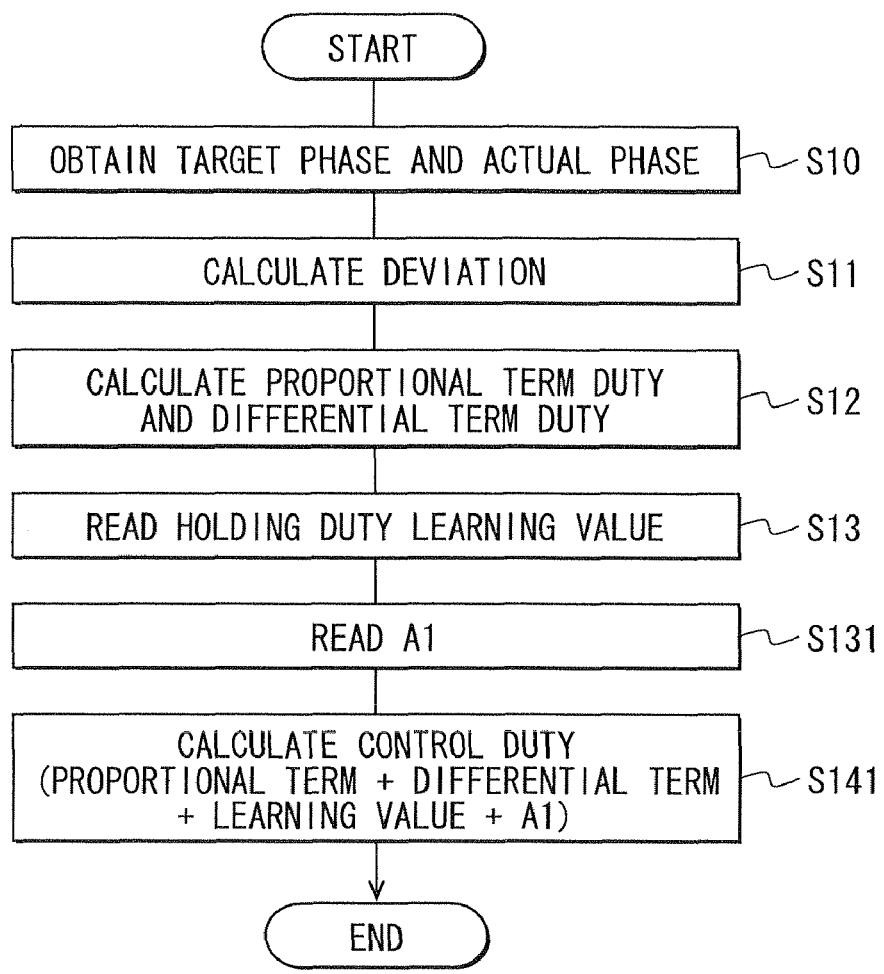
FIG. 6 is a flowchart showing a procedure for calculating a control duty value according to a second embodiment of the present invention.
Figure 7:
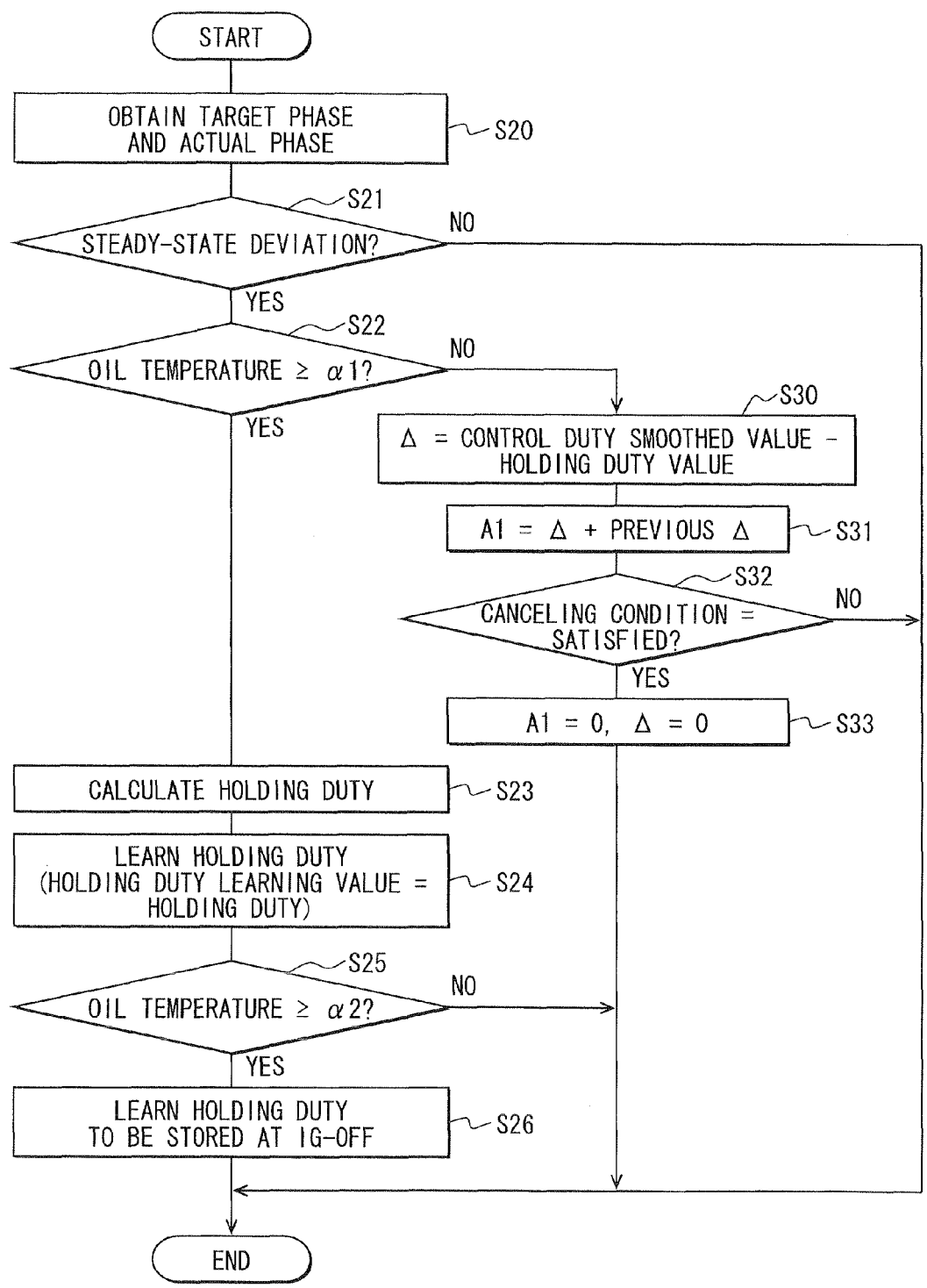
FIG. 7 is a flowchart showing a procedure for learning a holding duty value and for calculating a steady-state deviation correction value according to the second embodiment.

First in S10 to S13 of FIG. 6, like the processing shown in FIG. 2, the actual phase and the target phase are obtained (S10), the deviation between the obtained phases is calculated (S11), and the feedback correction values are calculated based on the calculated deviation (S12). In following S13, the learning value of the holding duty learned in S24 of FIG. 7 is read. Further, in S131, the steady-state deviation correction value A1 calculated in S31 of FIG. 7 is read.

In following S141 (control command value calculation section), the control duty of the current passed to the electromagnetic solenoid 37 is calculated based on the learning value of the holding duty, the proportional term duty, the differential term duty and the steady-state deviation correction value A1 read in S12, S13 and S131. More specifically, the control duty is calculated by adding the proportional term duty, the differential term duty and the steady-state deviation correction value A1 to the holding duty learning value.

In the learning processing of the holding duty value shown in FIG. 7, processing similar to the processing of FIG. 4 is performed first in S20 to S26. That is, the actual phase and the target phase are obtained (S20). When it is determined that the steady-state deviation is occurring (S21: YES) and that the hydraulic oil temperature is equal to or higher than the first determination value α1 (S22: YES), the holding duty at the time is calculated (S23), and the calculated holding duty is stored and updated as the learning value (S24). When the hydraulic oil temperature is equal to or higher than the second determination value α2 (S25: YES), the holding duty is stored as the initial value for the next engine start (S26).

Next, processing contents in the case where the hydraulic oil temperature is determined to be lower than the first determination value α1 (S22: NO) will be explained. First, the value of the steady-state deviation occurring at the time is calculated as a correction value Δ. More specifically, a value obtained by subtracting the holding duty at the time from the control duty at the time is used as the correction value Δ. As the control duty used in the calculation, an average value (smoothed value) of multiple control duty values at multiple time points such as a present time and time points going back from the present time by predetermined time lengths may be used. For example, an average value (smoothed value) of a present value, a previous value and a value preceding the previous value of the control duty may be used.

In following S31 (steady-state deviation correction section), a value obtained by adding a present value of the correction value Δ to a previous value of the correction value Δ is used as the steady-state deviation correction value A1. That is, if the steady-state deviation still remains even after the correction value Δ is added when the temperature is low (S21: YES, S22: NO), the correction value Δ is added to the steady-state deviation correction value A1 cumulatively. In following S32, it is determined whether either of two canceling conditions (explained below) is satisfied. The first canceling condition is satisfied if the mode is switched from the feedback mode to the holding mode. The second canceling condition is satisfied when the deviation between the target phase and the actual phase changes to an extent that the deviation goes out of a predetermined stable range because the target phase changes largely. That is, the second condition is satisfied when an absolute value of a change amount of the deviation per unit time (i.e., differential value) becomes larger than a preset value.

When either of the canceling conditions is satisfied (S32: YES), the steady-state deviation correction value A1, which has been added cumulatively, and the correction value Δ are reset to zero. If the canceling condition is not satisfied, the correction value Δ is added to the steady-state deviation correction value A1 cumulatively (S30, S31) as long as the hydraulic oil temperature is low and the steady-state deviation is occurring (S21: YES, S22: NO).

If the learning of the holding duty is prohibited when the hydraulic oil temperature is low, the hunting of the actual phase can be inhibited as mentioned above. However, there is still a concern that it will take a long time for the actual phase to approximate to the target phase. Regarding this concern, according to the present embodiment, when the canceling condition is not satisfied, as long as the hydraulic oil temperature is low and the steady-state deviation is occurring, the steady-state deviation (correction value Δ) occurring at the time is added to the steady-state deviation correction value A1 cumulatively, and the control duty is calculated based on the steady-state deviation correction value A1. Therefore, the time necessary for the actual phase to approximate to the target phase can be shortened. Moreover, since the learning of the holding duty is prohibited, the effect of inhibiting the hunting mentioned above is not hindered by the steady-state deviation correction value A1.

When the mode switches to the holding mode or when the target phase changes, the steady-state deviation correction value A1 and the correction value Δ are reset to zero. Therefore, overshoot of the actual phase, which can occur when the steady-state deviation correction value A1 is continued for a long time as it is, can be avoided.

Figure 8:
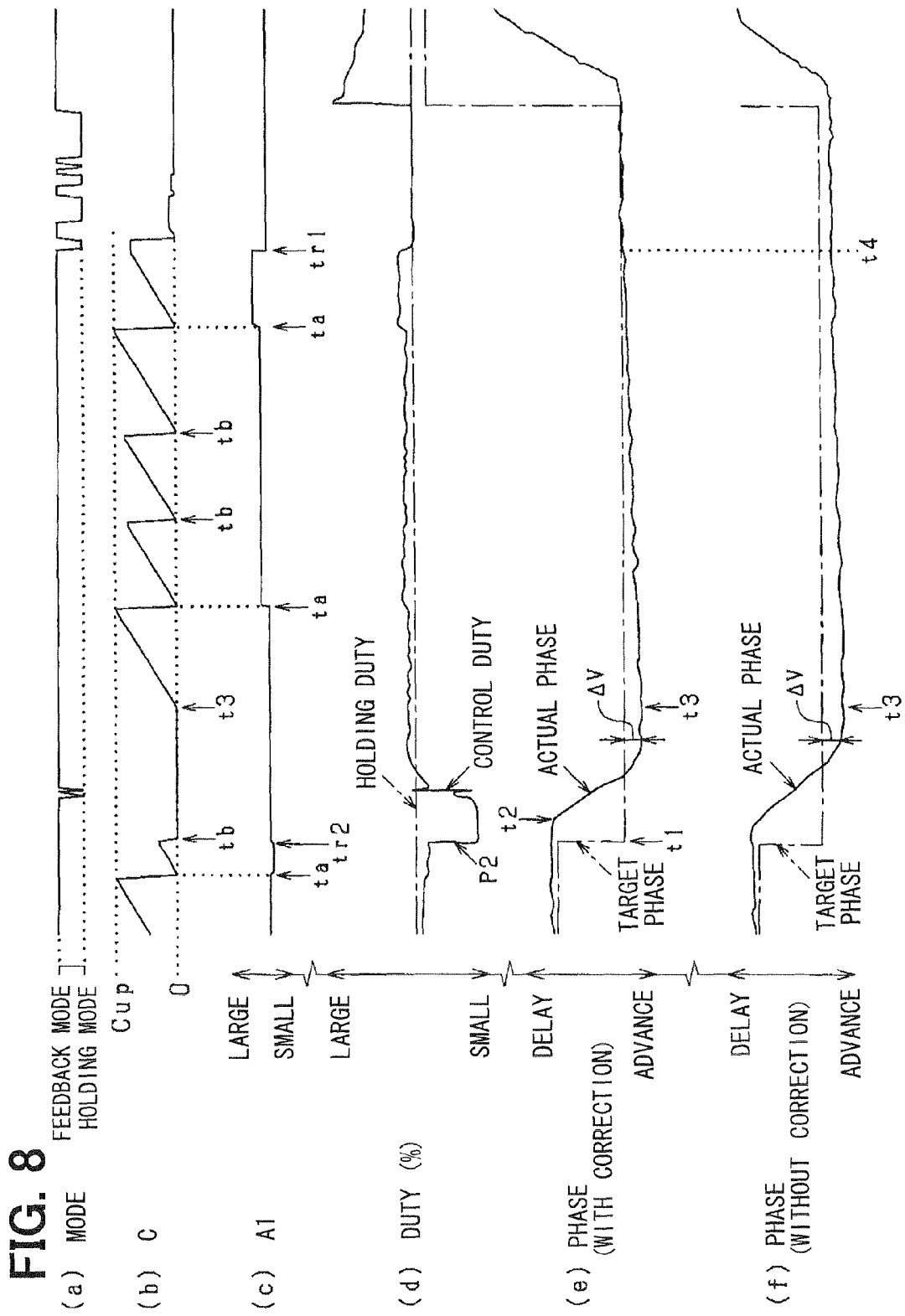
FIG. 8 is a time chart showing an execution mode of the processing of FIGS. 6 and 7.

FIG. 8 is a time chart showing an example of various changes in the case where the processing of FIGS. 6 and 7 is performed.

In FIG. 8, part (a) shows switching between the feedback mode and the holding mode, part (b) shows a value of a steady state determination counter C, part (c) shows the steady-state deviation correction value A1, part (d) shows the control duty (solid line) and the holding duty learning value (chained line), and (e) and (f) each shows the target phase (chained line) and the actual phase (solid line) in the case of the low hydraulic oil temperature. Part (e) shows the case where the steady-state deviation correction is performed and part (f) shows the case where the steady-state deviation correction is not performed.

If the target phase changes largely at a time point t1 (refer to part (e) of FIG. 8), the feedback correction values corresponding to the change are added to the holding duty, whereby the control duty changes (refer to P2 in part (d) of FIG. 8). Since the hydraulic oil temperature is low, the actual phase does not change to follow the target phase immediately after the time point t1, at which the target phase changes. Rather, the actual phase starts changing to follow the target phase at a time point t2 after an elapse of the time lag.

Thereafter, it is determined that a change rate (i.e., change amount per unit time) of the deviation ΔV between the actual phase and the target phase is equal to or smaller than a predetermined value, and the steady state determination counter C is started at a time point t3. If the stable state in which the change rate of the deviation ΔV is equal to or smaller than the predetermined value continues and the value of the steady state determination counter C reaches a count-up value Cup, the value of the steady state determination counter C is reset to zero at the time. In addition, the correction value Δ calculated in S30 is added to the steady-state deviation correction value A1, thereby correcting the steady-state deviation correction value A1 (refer to "ta" in part (c) of FIG. 8). The update of the holding duty is prohibited since the hydraulic oil temperature is low (refer part (d) of FIG. 8).

If the condition of the above-described stable state becomes not to be satisfied while the steady state determination counter C is counting the time, the value of the steady state determination counter C is reset to zero without correcting the steady-state deviation correction value A1 (refer to "tb" in part (b) of FIG. 8).

If the canceling condition in S32 is not satisfied, the steady-state deviation correction value A1 is cumulatively added as mentioned above. However, the canceling condition is satisfied at time points tr1 and tr2 shown in part (c) of FIG. 8. Therefore, the steady-state deviation correction value A1 is reset to zero at the time points tr1, tr2. That is, the mode switches from the feedback mode to the holding mode at the time point tr1 (i.e., first canceling condition is satisfied). The target phase changes largely at the time point tr2 (i.e., second canceling condition is satisfied).

When the steady-state deviation correction (i.e., calculation of control duty based on steady-state deviation correction value A1) is performed, the deviation ΔV occurring near the time point t3 becomes zero and the actual phase has converged to the target phase at a time point t4 as shown by the solid line in part (e) of FIG. 8. As contrasted thereto, when the steady-state deviation correction is not performed, although the deviation ΔV occurring near the time point t3 gradually approximates to zero as shown by the solid line in part (f) of FIG. 8, the actual phase has not yet converged to the target phase at the time point t4.

The present embodiment described above exerts following effects.

If the learning of the holding duty is prohibited when the hydraulic oil temperature is low, the hunting of the actual phase (refer to part (c) of FIG. 5) can be inhibited, but it takes a long time for the actual phase to approximate to the target phase as shown in part (f) of FIG. 8. According to the present embodiment taking this point into account, the holding duty learning value used for the calculation of the control duty is corrected based on the steady-state deviation correction value A1. Therefore, the time necessary for the actual phase to approximate to the target phase can be shortened as shown in part (e) of FIG. 8.

If the steady-state deviation correction value A1 set when the actual phase is slowly changing toward the target phase because of the low temperature is continued for a long time as it is, it will eventually cause the same situation as the case where the holding duty is learned when the temperature is low. As a result, the actual phase will overshoot as shown in part (c) of FIG. 5. According to the present embodiment taking this point into account, the steady-state deviation correction value A1 is canceled at the time points tr1, tr2. Accordingly, the above-described overshoot, which can occur if the steady-state deviation correction value A1 is retained for a long time, can be avoided while improving the response of the VVT 20 in a short term by performing the steady-state deviation correction when it is determined that the deviation ΔV is occurring steadily because of the low temperature.

Concerning the timing for canceling the steady-state deviation correction value A1, the above-described effect of shortening the time by the steady-state deviation correction is exerted in the feedback mode. However, in the holding mode in which the deviation is equal to or smaller than the predetermined value, such the steady-state deviation correction is unnecessary. When the target phase changes rapidly, the control duty changes largely due to the feedback correction. Therefore, the above-described effect of shortening the time by the steady-state deviation correction is not required under such the situations.

According to the present embodiment taking these points into account, the steady-state deviation correction value A1 is reset to zero at the time point tr1 when the mode switches from the feedback mode to the holding mode, i.e., when the steady-state deviation correction becomes unnecessary, and at the time point tr2 when the target phase changes rapidly. Therefore, the problem of the overshoot can be eliminated by interrupting the continuation of the steady-state deviation correction without hindering the effect of shortening the time.

Third Embodiment

Next, a third embodiment of the present invention will be explained.

In the above-described second embodiment, the control duty is calculated based on the holding duty learning value, the feedback correction values (proportional term duty and differential term duty) and the steady-state deviation correction value A1. In the third embodiment, the control duty is calculated by taking into account an oil pressure correction value A2 and a phase correction value A3 explained below in addition to the holding duty learning value, the feedback correction values and the steady-state deviation correction value A1. Hereafter, processing contents according to the present embodiment shown in FIGS. 9 and 10 will be explained, focusing on differences from FIG. 6. In the present embodiment, processing similar to the processing of FIG. 7 of the second embodiment is performed in addition to the processing of FIGS. 9 and 10.

Figure 9:
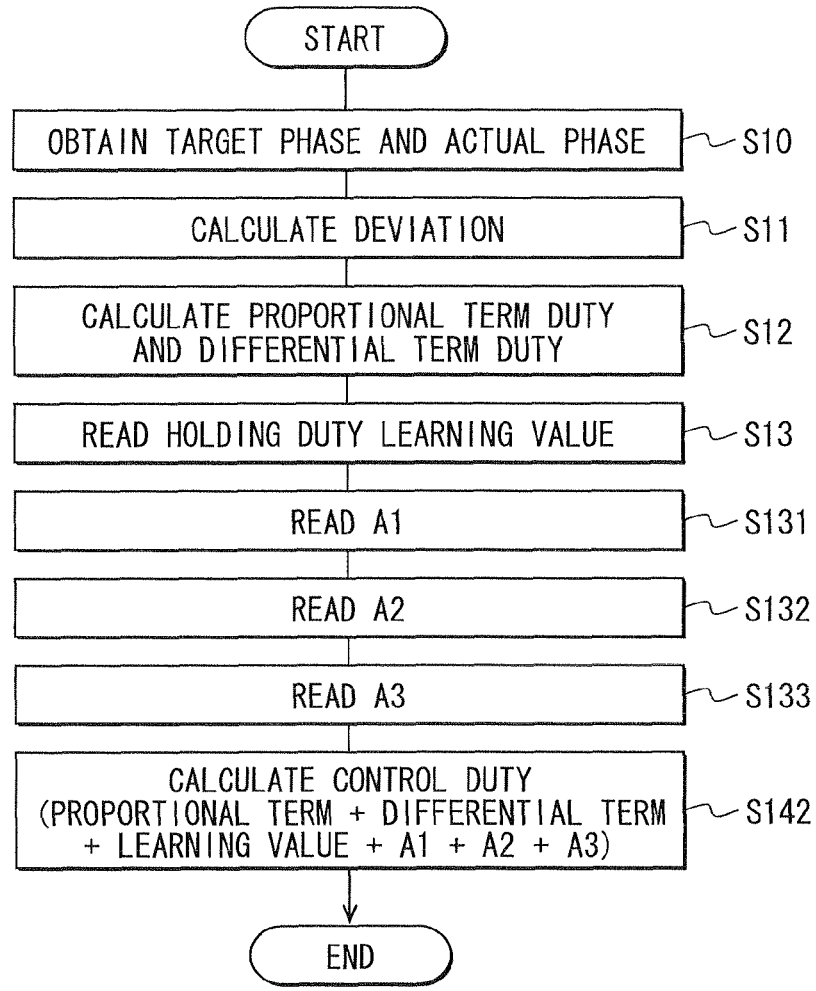
FIG. 9 is a flowchart showing a procedure for calculating a control duty value according to a third embodiment of the present invention.

First in S10 to S13 and S131 of FIG. 9, like the processing shown in FIG. 6, the actual phase and the target phase are obtained (S10), the deviation between the obtained phases is calculated (S11), and the feedback correction values are calculated based on the calculated deviation (S12). In following S13, the learning value of the holding duty learned in S24 of FIG. 7 is read. Further, in S131, the steady-state deviation correction value A1 calculated in S31 of FIG. 7 is read.

In following S132 and S133, the oil pressure correction value A2 and the phase correction value A3 calculated in S41 and S43 of FIG. 10 (explained later) are read. In following S142 (control command value calculation section), the control duty of the current passed to the electromagnetic solenoid 37 is calculated based on the learning value of the holding duty, the proportional term duty, the differential term duty, the steady-state deviation correction value A1, the oil pressure correction value A2 and the phase correction value A3 read in S12, S13, S131, S132 and S133. More specifically, the control duty is calculated by adding the proportional term duty, the differential term duty, the steady-state deviation correction value A1, the oil pressure correction value A2 and the phase correction value A3 to the holding duty learning value.

Figure 11:
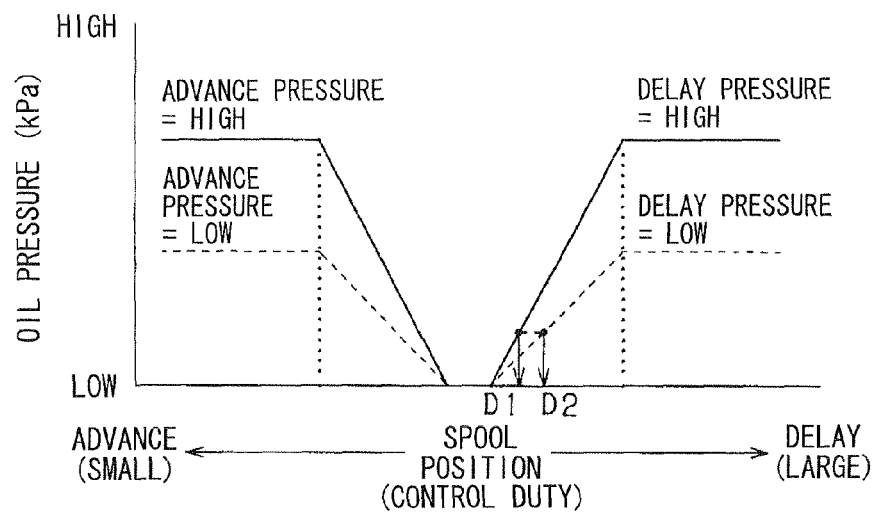
FIG. 11 is a map used for calculating the oil pressure correction value according to the third embodiment.

Even when the control duty is the same and the actuated position of the spool 35 is the same, the operation speed of the VVT 20 increases as the pressure of the hydraulic oil (i.e., oil pressure) at the time increases. Therefore, a relationship between the actuated position (i.e., control duty value) of the spool 35 and the oil pressure in the delay chamber 23 or the advance chamber 24 (i.e., force that operates VVT 20) indicates a characteristic shown by a solid line in FIG. 11 when discharge pressure from the hydraulic pump 38 is high. The relationship indicates a characteristic shown by a broken line in FIG. 11 when the discharge pressure is low. Therefore, for example, if the discharge pressure is low and the oil pressure in the delay chamber 23 is low when delay control for operating the VVT 20 toward the delay side is performed, it is required to move the spool position to the more delayed side. That is, it is required to change and increase the control duty from D1 to D2 as shown in FIG. 11.

Figure 10:
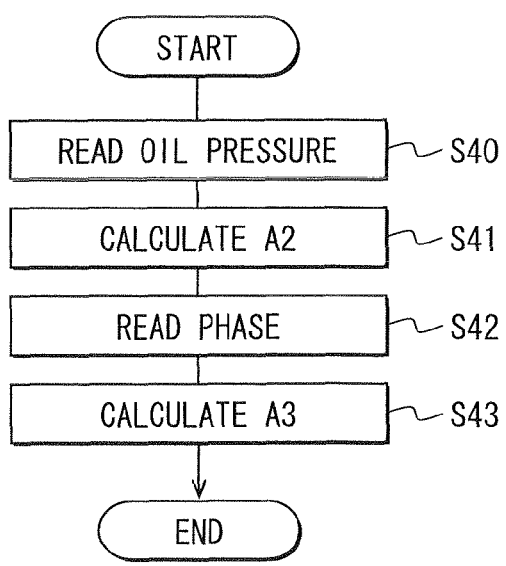
FIG. 10 is a flowchart showing a procedure for calculating an oil pressure correction value and a phase correction value according to the third embodiment.

Therefore, in the correction value calculation processing shown in FIG. 10, the pressure of the hydraulic oil calculated based on the sensing value of the oil pressure sensor 48 is read in S40, first. In following S41 (oil pressure correction section), the oil pressure correction value A2 is calculated such that the control duty increases as the oil pressure read in S40 decreases during the delay control or such that the control duty decreases as the oil pressure read in S40 decreases during advance control. For example, a map shown in FIG. 11 is obtained and stored beforehand by experiment, and the oil pressure correction value A2 is calculated using the map.

The coil spring 27 shown in FIG. 1 applies the elastic force to the both rotating bodies 21, 22 to approximate the actual phase to the lock position. The magnitude of the elastic force increases as the actual phase becomes more distant from the lock position. Therefore, even when the deviation between the actual phase and the target phase is the same, the elastic force applied to the VVT 20 in the direction to approximate the actual phase to the lock position (in direction toward advance side in example of FIG. 1) increases as the actual phase at the time is more distant from the lock position. Therefore, it is required to calculate the control duty by taking the elastic force into account.

Figure 12:
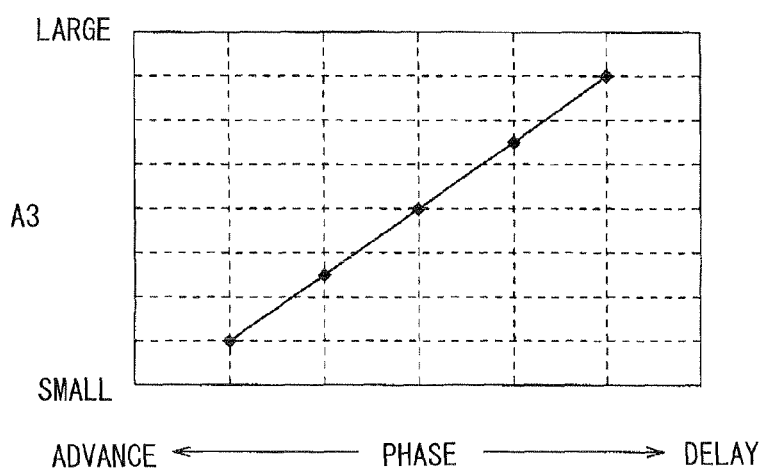
FIG. 12 is a map used for calculating the phase correction value according to the third embodiment.

Therefore, the actual phase is read in S42 of FIG. 10. In following S43 (phase correction section), the phase correction value A3 is calculated such that the control duty increases as the actual phase read in S42 is more distant from the lock position (to delay side in example of FIG. 1). For example, a map shown in FIG. 12 may be obtained and stored beforehand by experiment, and the phase correction value A3 may be calculated using the map.

The correction using the above-described oil pressure correction value A2 and the phase correction value A3 is performed invariably regardless of whether the oil temperature is determined to be low in S22 of FIG. 7 or whether the mode is the holding mode.

Thus, according to the present embodiment, the control duty is calculated in consideration of the magnitude of the elastic force of the coil spring 27 and the magnitude of the hydraulic oil pressure. Therefore, controllability of controlling the actual phase to the target phase (e.g., quick reaction property, stability and accuracy of control) can be improved.

Other Embodiments

The present invention is not limited to the above-described embodiments but may be modified and implemented as follows, for example. Further, characteristic constructions of the respective embodiments may be combined arbitrarily.

The lock position of the lock mechanism may be set at a middle phase between the most advanced phase and the most delayed phase. In this case, the coil spring 27 is fixed such that the coil spring 27 exerts the elastic force toward the delay side when the actual phase is on the advance side of the lock position and exerts the elastic force toward the advance side when the actual phase is on the delay side of the lock position. Also in this case, the phase correction value A3 may be calculated to cancel out the above-described elastic force.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An engine valve control device applied to an engine valve control mechanism having a hydraulic actuator that varies a rotation phase of a camshaft with respect to a crankshaft to adjust opening-closing timings of an engine valve, a control valve that controls a flow of hydraulic oil supplied to the hydraulic actuator, and an electromagnetic solenoid that controls an operation of the control valve according to a control command value, the engine valve control device comprising:

a control command value calculation means for calculating the control command value based on a holding value, which is a current value applied to the electromagnetic solenoid when the rotation phase does not change but is held, and a feedback correction value;

a feedback correction means for calculating the feedback correction value in accordance with a deviation between an actual rotation phase and a target phase; and a learning means for determining the deviation to be a steady-state deviation when the deviation occurs continuously for a predetermined time and for correcting the holding value in accordance with the steady-state deviation, thereby performing learning for storing and updating the holding value, wherein if temperature of the hydraulic oil is lower than a predetermined threshold value, the learning by the learning means is prohibited even when the steady-state deviation is occurring.

2. The engine valve control device as in claim 1, further comprising:

a steady-state deviation correction means for calculating a steady-state deviation correction value in accordance with the steady-state deviation if the steady-state deviation occurs when the hydraulic oil temperature is lower than the predetermined threshold value, wherein the control command value calculation means calculates the control command value based on the steady-state deviation correction value.

3. The engine valve control device as in claim 2, wherein the control command value calculation means calculates the control command value in a feedback mode that uses the feedback correction value when the deviation is larger than a predetermined value, the control command value calculation means calculates the control command value in a holding mode that does not use the feedback correction value when the deviation is equal to or smaller than the predetermined value, and the control command value calculation means resets the steady-state deviation correction value to zero when a mode switches from the feedback mode to the holding mode.

4. The engine valve control device as in claim 2, wherein the control command value calculation means resets the steady-state deviation correction value to zero when the deviation changes to an extent that the deviation goes out of a predetermined stable range.

5. The engine valve control device as in claim 1, further comprising:

an oil pressure correction means for calculating an oil pressure correction value for the control command value in accordance with pressure of the hydraulic oil, wherein the control command value calculation means calculates the control command value based on the oil pressure correction value.

6. The engine valve control device as in claim 1, wherein the hydraulic actuator has a first rotating body that rotates with either one of the crankshaft and the camshaft, a second rotating body that rotates with the other one of the crankshaft and the camshaft, and a spring member that applies an elastic force to the rotating bodies such that the rotation phase approximates to a predetermined phase, the engine valve control device further comprising:

a phase correction means for calculating a phase correction value for the control command value in accordance with the actual rotation phase, wherein the control command value calculation means calculates the control command value based on the phase correction value.

* * * * *